United States Patent [19]
Feinberg

[11] Patent Number: 5,598,456
[45] Date of Patent: Jan. 28, 1997

[54] INTEGRATED TELEPHONE, INTERCOM, SECURITY AND CONTROL SYSTEM FOR A MULTI-UNIT BUILDING

[76] Inventor: David H. Feinberg, 2 Apollo Rd., Manalapan, N.J. 07726

[21] Appl. No.: 430,573

[22] Filed: Apr. 28, 1995

Related U.S. Application Data

[63] Continuation of Ser. No. 81,876, Jun. 23, 1993, abandoned.

[51] Int. Cl.$^6$ .................................................. H04M 11/04
[52] U.S. Cl. ............................ 379/42; 379/43; 379/44; 379/47; 379/49
[58] Field of Search .......................... 379/37–51, 102, 379/103, 104, 105, 106, 107; 340/531, 505, 506; 348/143

[56] References Cited

U.S. PATENT DOCUMENTS

| | | | |
|---|---|---|---|
| 3,917,911 | 11/1975 | Lesher | 379/103 |
| 3,937,889 | 2/1976 | Bell III, et al. | 179/2 DP |
| 3,947,641 | 3/1976 | Trell | 379/103 |
| 3,978,479 | 8/1976 | Schmitz | 340/420 |
| 4,023,139 | 5/1977 | Samburg | 379/103 |
| 4,097,690 | 6/1978 | Kuntz et al. | 379/44 |
| 4,308,430 | 12/1981 | Fahey et al. | 179/5 R |
| 4,332,980 | 6/1982 | Reynold et al. | 379/49 |
| 4,493,947 | 1/1985 | Loveless | 179/2 A |
| 4,511,886 | 4/1985 | Rodriguez | 340/506 |
| 4,622,538 | 11/1986 | Whynacht et al. | 340/506 |
| 4,641,127 | 2/1987 | Hogan et al. | 379/45 |
| 4,644,104 | 2/1987 | Middlemiss | 379/103 |
| 4,659,876 | 4/1987 | Sullivan et al. | 379/96 |
| 4,665,544 | 5/1987 | Honda et al. | 379/104 |
| 4,679,226 | 7/1987 | Muehleisen | 379/188 |
| 4,750,197 | 6/1988 | Denekamp et al. | 379/58 |
| 4,791,658 | 12/1988 | Simon et al. | 379/42 |
| 4,827,085 | 5/1989 | Yaniv et al. | 379/100 |
| 4,899,217 | 2/1990 | MacFadyen et al. | 379/102 |
| 5,019,802 | 5/1991 | Brittain et al. | 340/522 |
| 5,046,083 | 9/1991 | Trell | 379/103 |
| 5,134,644 | 12/1973 | Garton et al. | 379/39 |
| 5,194,846 | 3/1993 | Lee et al. | 340/505 |
| 5,289,534 | 2/1994 | Lester et al. | 379/103 |

OTHER PUBLICATIONS

A. Stienstra, *Telecommunications and the Introduction of Home Networks for the Residual Market*, FIT, vol. 3, No., pp.: 55–63, (Jan./Feb. 1992).
Rolm, *Phonemail Keeps Your Business in Touch* (Brochure), (1992).
Rolm, *The Rolmphone 300/800 Series* (Brochure), (1992).
Ademco, *VISTA 4140XMPT Partitioned Security System*, (1991).
NECA, *Home Automation Systems: State of the Art*, (1991).
Rolm, *ROLM 9750 Business Communications System*, (1991).
Rolm, *9750 Business Communications System: System Description, Release 9005*, (1990).
Dak Electric Contracting Corp., *Lincoln Square Telecommunications Outline*, (Feb. 1993).

*Primary Examiner*—Jason Chan
*Attorney, Agent, or Firm*—Pennie & Edmonds

[57] ABSTRACT

An integrated telephone, intercom, security and control system for a building having a plurality of units, utilizing a plurality of telephone lines located throughout the building which are connected at one end to telecommunications equipment located in the units and throughout common areas of the building. A digital switching device is connected to the other end each of the telephone lines and arranged to connect at least one of the telephone lines to at least one of another of the telephone lines or to an outside telephone line at the option of a user of the telecommunications equipment. A plurality of sensors located in the units and throughout common areas of the building are arranged for generating signals in response to conditions therein, which are then transmitted to a plurality of control modules connected to the digital switching device by at least one of the telephone lines. The control modules are further adapted to send information to a central monitoring station via the telephone lines indicative of the respective conditions and the central monitoring station is adapted to at least receive and store this information in its memory and output data indicative of the respective conditions.

51 Claims, 1 Drawing Sheet

INTEGRATED TELEPHONE, INTERCOM, SECURITY AND CONTROL SYSTEM FOR A MULTI-UNIT BUILDING

This is a continuation, of application Ser. No. 08/081,876, filed Jun. 23, 1993, now abandoned.

BACKGROUND OF THE INVENTION

The present invention relates to a building control system and in particular to an integrated telephone, intercom, security and control system for a multi-unit building.

It is known to provide security systems for multi-unit buildings. For instance U.S. Pat. No. 4,644,104 to Middlemiss discloses a security system for a multi-unit facility such as a hotel wherein access to each unit or room is accomplished through a door structure which incorporates a separate locking assembly. The locking assembly is of the keyless entry type wherein a present code is fed into an electronically controlled lock through a plurality of switches for authorized entry. Each of the actuating facilities associated with each closure is capable of having a stored preset code changed through operation of a microprocessor. Telephone lines interconnect the activating and locking facilities associated with each room to a central control facility.

U.S. Pat. No. 5,134,644 to Garton et al. also discloses an alarm and security system. One embodiment of that system includes a communications panel having a first transceiver for receiving information about one or more desired conditions in one or more geographical areas and for receiving a control signal and for transmitting the desired condition information and control signal to a base station. The system accepts information from an existing panel via telephone lines and transfers a full data message to a base station.

Similarly, U.S. Pat. No. 4,023,139 to Samburg discloses a security control and alarm system including a central station communicating with each of plural remote stations, or facilities, protected by the system. The remote stations may be multi-zone office buildings, shopping centers, or any of various specialized applications. The central station provides point-to-point monitoring of each protection sensor device at each remote station. Protection sensors of any desired type are encompassed by the system, including detectors for unauthorized entry, fire, smoke, mechanical equipment failure and the like. The central station also provides remote control of various security functions including selective arming and disarming of the remote station, resetting of the alarm condition following an alarm activation, operating doors to permit access to authorized personnel, operating elevators to restricted, selected floors of a building and any of various other types of desired control functions. The system also may provide general remote control of non-security building functions. Communication between the central and remote is provided by a multiplexer over standard voice grade telephone lines. Each person authorized to gain access to a remote, protected facility is provided a password. At the entrance of the facility, there is provided a telephone with a direct line connection to the central station. An individual wishing to gain access must call and give the correct password to an operator at the central station in response to which the operator issues a control to the remote facility for unlocking the entrance door.

Additionally, known systems provide intercommunication and alarm telephone systems for residential use. For instance, U.S. Pat. No. 4,097,690 to Kuntz et al. discloses an intercommunication and alarm telephone system having a common control in the form of a clock driven central unit connected to an alarm control unit and one telephone line shared by a plurality of station units. The central control unit provides means for answering and placing outside telephone calls to a central telephone office, holding and transferring such calls, giving paging and intercom services, giving suitable alarms, and such other services as may be necessary or desirable.

Finally, various control and communications systems are known for use in the residential environment. For example, U.S. Pat. No. 4,665,544 to Honda et al. discloses a home control system and interphone system including a pair or plural pairs of home information transmission paths (referred to as home bus); information outlets provided at the home bus which serve as connection nodes for appliances; and a plurality of room monitor controllers (hereinafter referred to as RMC) each having a built-in interface unit which has a control function element peculiar to respective rooms and carries out communication control between the information outlets and the appliances.

Similarly, U.S. Pat. No. 4,899,217 discloses a communication and energy control system for houses. That patent describes an automated system for providing different services within a house. The system includes an appliance coordination data network for communicating relatively low speed appliance digital data within a house, a high capacity data network for transferring high speed digital data within the house, an energy distribution system for distributing energy throughout the house, an analog services distribution system for distributing conventional analog signals throughout the house and a video services distribution network for distributing video services throughout the house. The appliance coordination network interfaces with the energy distribution system to control the flow of energy to appliances throughout the house responsive to a digital request or interrogation signal that is emitted from the appliance itself.

However, none of the systems described above disclose an integrated telephone, intercom, security and control system that is particularly well suited for a multi-unit building. Accordingly, the present invention provides such a system and includes a number of advantages over the previous systems described above.

SUMMARY OF THE INVENTION

The present invention relates to an integrated telephone, intercom, security and control system for a building having a plurality of units. The system includes a plurality of telephone lines (i.e., pairs of telephone lines) located in the building and connected at one end to telecommunications equipment located in the units and throughout common areas of the building.

A switching means is connected to the other end of each of the telephone lines and arranged to connect at least one of the telephone lines to at least one other telephone line either inside the building or to an outside telephone line at the option of the user of such telecommunications equipment. While the switching means is preferably located within the building it services, it may be located remotely from the building and connected thereto by telephone company lines or private telephone lines. The switching means is arranged such that each telephone line connected thereto has a unique telephone number.

As a result of the above-described arrangement, the telephone lines function as both an intercom system and a telephone system for the building.

A plurality of sensors located in the units and throughout common areas of the building are arranged for generating signals in response to conditions therein. A plurality of control modules connected to the switching means by at least one of the telephone lines is adapted to receive the signals from the sensors and determine the respective conditions. A central monitoring station, including at least a memory device and an output device, is also connected to the switching means via at least one of the telephone lines. The control modules are adapted to send information to the central monitoring station, via the telephone lines, indicative of the conditions, and the central monitoring station is adapted to at least receive the information, store the information in its memory and output data indicative of the various conditions.

The control modules are also adapted to selectively send information to the central monitoring station only upon determining a change in at least one of the conditions. Such a changed condition represents an alarm signal to the central monitoring station. Each control module is further adapted to accept commands from a user calling its unique telephone number via said switching means. The commands include selectively activating/deactivating at least one of said sensors and obtaining status information regarding the sensors.

Preferably the control modules are further adapted to transmit signals to at least one device, e.g., an air conditioning unit, located in at least one of said units to activate/ deactivate the device.

The central monitoring station of the present invention preferably includes at least a central alarm station and a concierge station having a personal computer and a printer. The central alarm station is adapted to receive the information from each of the control modules and transmit a data stream representative of the information to the personal computer. The personal computer is adapted to receive and store data transmitted thereto and output to said monitor and printer said alarm condition and said user programmed information.

Additional monitoring stations similar to the concierge station may also be included to receive information from control modules via the central alarm station. The central monitoring station and the additional monitoring stations may be arranged to control distinct areas of the building and also arranged to provide redundant control.

Preferably, the system of the present invention includes means for transmitting non-broadcast television signals at least to a plurality of said units. Closed circuit cameras are located in common areas of the building and may be coupled to the means for transmitting non-broadcast television signals. The central monitoring station may further include means for selectively connecting the outputs of the closed circuit cameras to the means for transmitting non-broadcast television signals based on user information sent to the central monitoring station via the telephone lines. Outside cable company lines or other "pay per view" transmissions can also be coupled to the means for transmitting non-broadcast television signals and monitored and controlled by the central monitoring station.

The preferred system of the present invention can further include a file server having a memory device and connected to said switching means by at least one telephone line. Each of the units having access to the file server via the telephone lines. The file server is adapted to store resident software that can be selectively accessed via said telephone lines by said users. Also, the file server can be coupled to the means for transmitting non-broadcast signals such that, for example, inter-building pay- per-view movies or sporting events, can be controlled.

DETAILED DESCRIPTION OF THE PREFERRED EMBODIMENT

Figure 1:
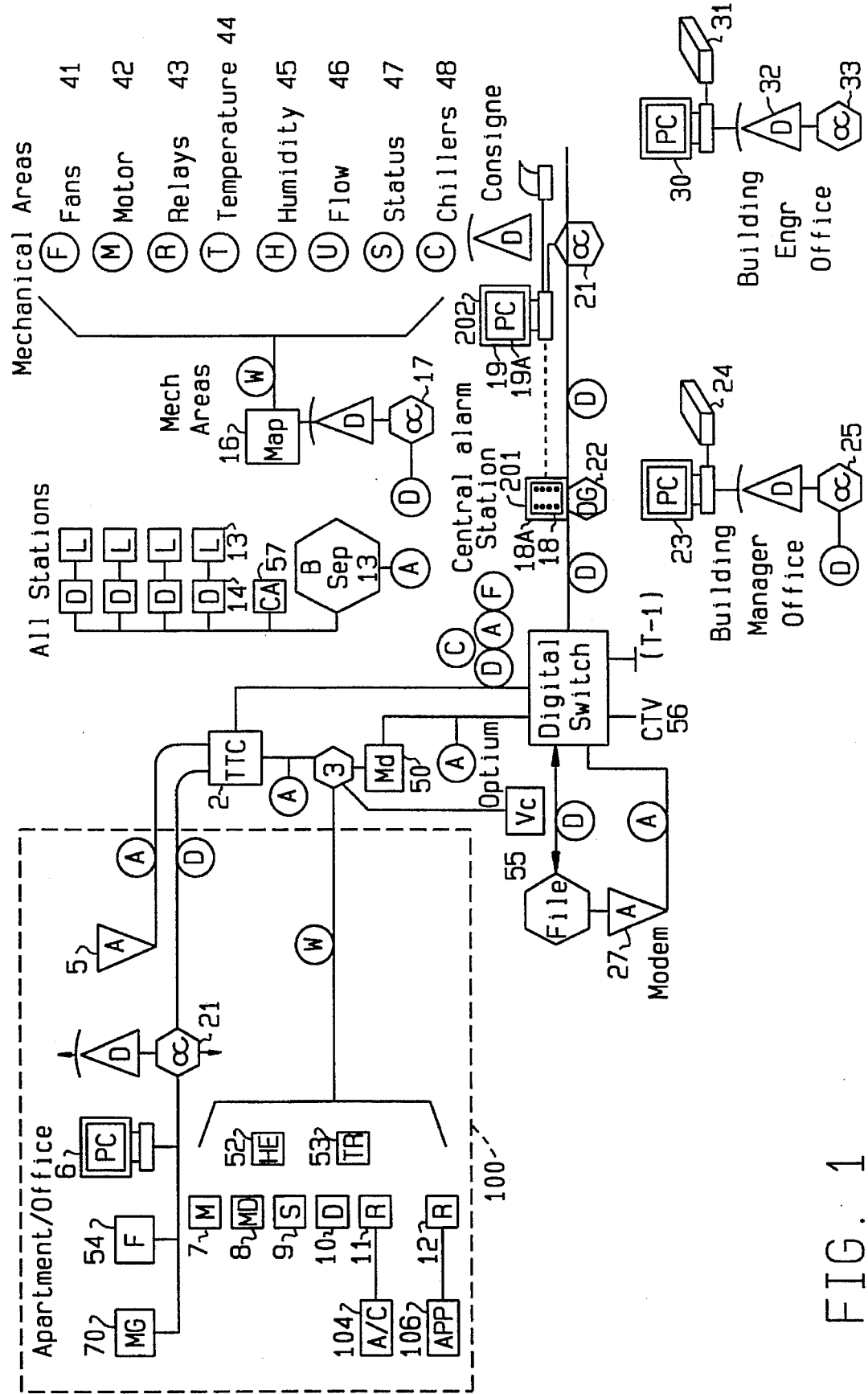
FIG. 1 is a schematic diagram of the integrated telephone, intercom, security and control system for a multi-unit building in accord with the preferred embodiment of the present invention.

FIG. 1 depicts the elements of the preferred embodiment of the present invention and shows their interconnection. The system shown is typically located in a single multi-unit office building or apartment building (cooperative, condominium, etc.) having numerous users (tenants, office personnel, building supervisory personnel, etc.). The units, an exemplary one indicated by the dotted line 100, are accordingly individual offices or apartments. Additionally, the units can be common areas in such buildings such as stairwells, physical fitness centers, laundry facilities, meeting rooms, rooftops and the like. Further, multiple buildings can be controlled by a single one of the systems described herein.

Throughout the building there are a plurality of telephone lines to the individual units, to common areas and to areas maintained by supervisory personnel. These lines may be standard copper lines (C) or fiber optic lines (F) and may carry information in analog (A) and/or digital (D) form. At one end, each of the telephone lines is connected to telecommunications equipment that may include analog and/or digital telephones (via analog telephone jacks 5 and digital telephone jacks 4), modems (facsimile machines 54), personal computers 6 (via modems, digital computer outlets (DCOs) 21, or digital computer modules (DCMs)). Preferably, each unit includes at least one telephone line and the telecommunications equipment is typically found therein, although it will also be found in the common areas and at stations maintained by supervisory personnel. The operation of such telecommunications equipment is well known and will be understood by those skilled in the art.

At the opposite end, each of the telephone lines terminates in a switch 1. Switch 1 is a typical private branch exchange (PBX) switch well known by those skilled in the art. Preferably, the switch 1 has the capacity to interface with both analog (A) and digital (D) telephone lines including fiber optic (F) lines, however, the switch 1 may be of the type designed for solely an analog or digital environment. The switch 1 is typically located in the building in which it services, but may be located in the central office of a local telephone company and connected to the building via telephone company lines or private telephone lines. For purposes of example, the switch employed herein is a Rolm™ 9751 Computerized Branch Exchange.™ Such a switch is designed for both analog and digital interfacing and as such is particularly well suited for the present invention. From 50 to 20,000 telephone lines (or more) can be connected to the switch 1 with each line having its own distinct telephone number. The switch 1 is also connected via outside telephone company lines or private telephone lines to allow for local and long distance calling.

The switch 1 is adapted to connect any one of the telephone lines in the building to another telephone line in the building or to an outside telephone line at the selection of the user of the telecommunications equipment. In a well known fashion, when a user proceeds a call with the number "9", for example, the switch is programmed to recognize this as a request to connect the user's line to another telephone line within the building. When a call is not proceeded by the number "9", the switch recognizes this as a request for an outside telephone line. Of course, via a simple modification, the switch 1 can be programmed to recognize the inverse functions, i.e., a call proceeded by a "9" as a request for an outside telephone line and a call not proceed by a "9" as a request for another telephone line within the building. As such, the switch 1 serves to provide an intercom system for the building and the normal local and long distance calling services for the building.

Additionally, the switch 1 is able to connect any one of the telephone lines in the building to multiple telephone lines in the building or to multiple outside telephone lines at the selection of a user. This allows for, in addition to typical "Conference calling" using telephone company lines, inter-building conference calling without using the telephone company lines and the tariffs associated therewith.

Telephone terminal cabinet (TTC) 2 is a standard telephone interconnect cabinet that is typically employed in multi-unit buildings of the type herein described to connect telephone lines from the individual units to the switch 1. The TTC simply serves as a common arrangement for collecting each of the telephone lines. Electrically, the TTC may not even exist since it simply serves as an interconnect. In fact, each telephone line can be directly connected to the switch 1, although this is seldom done due to the ease with which the TTC permits trouble-shooting. The TTC typically contains 110 blocks and serves multiple floors with the number of TTCs per building dependent on the number of telephone lines required on each floor.

Throughout the building there are located a plurality of different detectors and sensors for generating signals representative of various conditions in each of the units and in common areas of the building. For purposes of example, a motion detector 7, a smoke detector 9 and a door contact detector 10 are shown. The detectors function in a conventional fashion and are well known by those skilled in the art. For example, the door contact detector 10 can be a simple switch indicating the open/closed status of the door to an individual unit, a door within the unit or a common area door such as a door to a stairwell. Additional detectors and sensors, which will all be similarly well understood by those skilled in the art, can include a hazardous air condition sensor, a sensor to sense movement of a person or to sense movement of personal property, such as a classic painting, from its usual location and a detector to determine the open/closed condition of the windows to a unit. For purposes of clarity, these various sensors and detectors are collectively referred to herein as "sensors".

Each of the sensors is connected to and communicates with a control module 3 (described below) via a copper wire pair (W). Although a copper conductive wire pair, one for each sensor, is currently the connector of choice due to its low cost and reliable operation, wireless transmitters/receivers 53 employing existing X-10 technology, for example, can be employed. Additionally, it is also possible that a single addressable communication link be established between each of the sensors and an associated control module 3.

The sensors output signals via the wire (W) or otherwise to the control module 3. These signals are indicative of conditions in the units in which the sensors are located. For instance, a smoke detector will output a signal indicative of smoke in one of the units or in a common area should such a condition arise. Similarly, a door contact detector will output a signal indicative of the open/closed status of a door. The exact nature of the signals will be discussed in more detail below.

The control module 3 is essentially the "brains" of the present invention. The control module 3 is connected to the switch 1 by a telephone line via the telephone termination cabinet 2, or is directly connected to the switch 1 via a telephone line or both. In a typical multi-story apartment or office building, there will be numerous control modules 3 each connected to the switch 1 as described above. Each module 3 can be responsible for a particular section of the building, e.g., signals from common areas only, signals from floors 3–8, etc. The control module 3 includes at least a memory 50 and processing means. A typical control module 3 for use with the present invention is a standard multiplex panel. Such a device is programmable as is known by those skilled in the art so as to allow various control functions.

As noted above, the control module 3 is connected to each of the sensors by the copper wire pairs (W) (although only a single wire representative of a single pair is shown in the figure, there will be one wire pair for each sensor in a typical arrangement) and is adapted to receive the output signals and determine from the output signals respective conditions. Each control module 3 is further adapted to send information to a central monitoring station 18,19 (discussed below) via the telephone lines indicative of the determined conditions. Preferably, each control module 3 does not continuously send information to the central monitoring station 18,19, but only selectively sends information upon determining a change in at least one of the conditions.

It should be noted at this point that when the central monitoring station 18,19 receives information from the control module 3 indicating a changed condition, such a change represents an alarm condition to the central monitoring station 18,19.

When the control module 3 does not detect a changed condition or an alarm condition with regard to a particular sensor, a closed circuit condition having a predetermined resistance exists in the circuit formed by the control module 3, the copper wire and the sensor. However, should a smoke condition (for example) arise in the vicinity of a smoke detector, the smoke detector will, in a conventional fashion, change the resistance in the circuit containing the control module 3. The control module 3 is designed to detect this changed resistance and determine that a smoke condition exists in the vicinity of the smoke detector.

Similarly, cutting the copper wire or putting a jumper on the wire will also result in a changed resistance recognizable to the control module 3 as such. This arrangement helps to make the system of the present invention tamper-proof. Alternatively, a hall effect device 62 connected to each of the sensors and to the control module 3 could be used to produce a voltage recognizable in response to a changed condition.

The door contact sensor 10 as well as each of the other sensors will function in a similar fashion. Thus, when a door connected to such a sensor is closed (in its normal position), a closed circuit having a predetermined resistance will be seen on the copper wire connecting that sensor to the control module. However, when the door is opened, the resistance in the circuit will change indicating to the control module the open door.

Once detecting these changed conditions, the control module 3 will selectively send the information via the telephone lines, through the switch 1 and to the central monitoring station 18,19 also connected to the switch via at least one telephone line. The information sent to the central monitoring station 18,19 can include at least one bit of information for each sensor connected to the control module 3. The bit of information having a logic level based on the resistance of the circuit. Alternatively, industry standard device codes such as X-10 can be employed.

The central monitoring station 18,19 can take on numerous forms and need only include a memory device and an output device. The central monitoring station 18,19 is adapted to receive and store the information sent by the control modules 3 and output information indicative of the status of the sensors.

While a simple personal computer would be sufficient to serve as the central monitoring station 18,19, in the preferred embodiment of the present invention two distinct devices are employed; a central alarm station 18A and a concierge station 19A. The central alarm station 18A receives information via multiple telephone lines from all of the control modules 3 in the building. The central alarm station 18A converts the information from the multiple inputs into a data stream which it sends to the concierge station 19A via a conventional RS-232 connector 201 or via a digital telephone line employing a DCM 22. The concierge station 18A is typically a personal computer with an associated monitor 202 and printer 204 which receives and stores the information and sends an output including at least alarm conditions to the monitor and printer.

For instance, if the control module 3 detects a smoke condition in a particular location, a change in resistance appears on the line connecting the control module 3 and the active smoke detector. The control module immediately "calls" the central alarm station 18 and forwards the information. regarding the smoke condition. Such information is immediately forwarded to the concierge station 19 and displayed on the monitor 202 and/or the printer 204. Additionally, the control module can be programmed to also call the appropriate fire department in the event of such a smoke condition.

The central monitoring station 18,19 is further operable to display user programmed instructions stored in its memory. For example, a tenant of a particular unit can have programmed into the central monitoring station his choice of information to be displayed in the event that unauthorized personnel enter his apartment. Such information can include instructions on the appropriate persons to contact and notify in the event of such an alarm condition.

As noted above, each of the telephone lines connected to the switch 1 has a unique telephone number associated therewith. Further, the control module 3 described above is connected to the switch 1 and is adapted to accept commands from a user calling its unique telephone number. Thus, tenants of a particular building or office personnel can call the control module 3 and enter various commands. Preferably, each user is assigned a unique user number and/or password which are stored in the memory of the control module 3. As a result, a user gaining access to the switch 1, via a telephone line from inside or outside the building (including cellular phones, mobile phones and the like), who supplies an appropriate user number and/or password, can enter commands. Typically, the commands are entered via a touch tone telephone, however, the control module 3 can be programmed to accept certain voice commands. In one arrangement, a user is assigned a six number entry code with the first two digits signifying a partition on the control module 3 and the last four digits representing user codes.

As also noted above, each control module 3 does not instantaneously send information to the central monitoring station 18,19 regarding a changed condition. Rather, the sending of information by the control module 3 is performed selectively. While it is of course desirable to immediately send information regarding a smoke or fire condition to the central monitoring station 18,19, this is not equally desirable with all conditions. With a condition such as an open door condition, it is often desirable to delay output to the central monitoring station 18,19 for a predetermined period of time (e.g. 10 seconds) in order to afford an authorized user, e.g., the tenant of the particular apartment, the opportunity to deactivate (the "deactivate" command is discussed below) the respective sensor. Therefore, the system of the present invention provides for the selective output or sending of information by the control modules 3 to the central monitoring station 18,19.

The central monitoring station only receives information from the control modules when there is a change in condition. In order to detect if a control module is operating properly or is disabled, however, the central monitoring station of the present invention periodically polls each of the control modules to determine if the modules are still active. If they are not, the central monitoring station outputs a message to this effect. In addition, when battery operated sensors are used, the central monitoring station can poll the sensors via the control modules to determine if the battery charge is sufficient for normal operation, and to output a message when the battery charge is low.

While the information controlling the selective output of information could be originally stored in the memory of the respective control modules 3, such a system requires the programming of numerous devices throughout a large building and would be inefficient. Additionally, in the event of a power loss, each of the control modules would have to be reprogrammed.

Advantageously then, the selective output of data by the control modules 3 is controlled by user programmed information stored in the memory of the central monitoring station 18,19 and downloaded to a memory in the control module 3 at the direction of supervisory personnel. This information can include the amount of time from the determination of a changed condition the control module 3 allows for entry of a deactivation command as discussed above.

In a similar fashion, user identification numbers and passwords can be stored in the central monitoring station and downloaded to the individual control modules.

Preferably, the commands entered by a user can include activating and deactivating some or all of the sensors and obtaining status information (alarm conditions) concerning the sensors. As described above, each sensor is connected to its associated control module by individual conductive wire pairs showing various resistances. The control module is programmed to recognize the resistance of each one of these wires as one bit of information of a block of information for each user. When a user enters a command for status information via a touch tone phone (after supplying appropriate identification and/or password information), the control module simply scans the block to verify that the state of none of the bits has changed since being activated. If any bits have changed, the user is appropriately advised of the existing alarm condition, e.g., "bedroom window ajar," by voice synthesis means 55 in said command module.

When a sensor is deactivated by a user via appropriate commands, the control module 3 simply disregards the signal received from the deactivated sensor. Further, the activation status of each of the sensors can also be stored by the control module 3 and provided to a user via entry of appropriate commands.

In addition to the various sensors and detectors described above, preferably the present invention also includes a sensor located in each office or apartment that is designated for activation by a person in physical distress in the office or apartment; a so-called "panic button" 7. This button can be used for medical emergencies and/or physical peril, e.g. an unauthorized person is in the apartment or office. Like the other sensors and detectors, this type of detector may be hardwired to or in wireless transmission with the control module 3 and is similarly controlled. In addition, the control module 3 can be programmed to recognize entry of a code which signifies an emergency condition, rather than deactivation of the sensor, in order to send a silent alarm to the central station.

Not only is the control module 3 of the present invention adapted to receive signals from the various sensors described above, the control module is further operable to transmit signals to various devices to activate/deactivate the devices. These devices can include air conditioning units 104, video cassette recorders, radios, televisions, heaters, photocopy machines, pet feeders, lamps, etc. (collectively indicated by 106).

Based on presently available technology, each of these devices is preferably connected to the control module via a conductive wire and a low voltage relay 11,12. Among the commands the control module is adapted to accept from a user are commands to activate and deactivate the devices via the relays. Furthermore, the status information produced by the command modules at the request of a user can also include the activation/deactivation status of various devices.

As discussed above, throughout the building there are a plurality of sensors connected to various control modules. Preferably, a group of these sensors are employed to monitor conditions in the common areas of the building and are connected to a control module 108 dedicated to that purpose. These sensors can be employed to monitor the opening and closing of doors to stairwells 14, laundry rooms, etc., and to monitor various other conditions in such common area. Additionally, the dedicated control module 108 can transmit signals, based on commands from the central monitoring station, for example, to an electrical door latch 15 connected to common area doors 14 that will open or close such door.

In addition to the central monitoring station 18,19, the system of the present invention preferably includes additional monitoring stations 23 and 30 each having a memory device and an output device and each connected the switch 1 via at least one of the telephone lines. One of these stations 23 is preferably located in a building manager's office and one in the office of a building engineer 30. These additional monitoring stations are generally arranged to receive data from the central alarm station 18 via a telephone line. An RS-232 line can instead be used for this purpose. Thus, only a single central alarm station 18A is employed for all of the monitoring stations.

Each of the monitoring stations is preferably arranged to receive data from control modules 3 located in different sections of the building. Thus, the additional monitoring station 23 in the building manager's office can be arranged to receive information from the control module 108 dedicated to the common areas, while the central monitoring station can receive information from control modules dedicated to apartments or offices. Alternatively, in a multi-story office building, one of the control stations can receive information from control modules on the upper floors of the building and one control station can receive information from control modules on lower floors of the building. For purposes of security, however, it may be desirable for each control station in such a multi-story building to receive information from all of the control modules throughout the building and to only process information for selected sections, e.g., only the upper or lower floors of the building, in normal use. In the event of an emergency situation such as a terrorist bomb destroying some, but not all, of the control stations, the surviving control stations are then adapted to process information from any of the control modules as necessary. In operation, the various monitoring stations poll each other or in some fashion communicate in order to provide for automatically allowing another station to pick up functions of a non-functioning station.

The preferred embodiment of the present invention additionally includes at least one mechanical alarm panel 16 connected to the switch 1 via at least one telephone line and a DCM 17. As is known by those skilled in the art, a mechanical alarm panel-(MAP) is a device used to monitor a plurality of devices throughout the building. The MAP is generally connected to a plurality of analog devices and is arranged to produce a digital output. The output of the MAP is sent to supervisory personnel such as the building engineer at her associated control station 23 via the switch 1.

The analog devices typically include thermometers, barometers, relays, fans, motors, flow meters, chillers, boilers and waterheaters. Digital devices may also be included.

Additionally, each unit of the building can include various meters 70 for monitoring utility use (gas, oil, water, electricity, steam, etc.) and each having an analog or digital output connected to a MAP. This information can be sent to building supervisory personnel who can use it to determine such information as the cost per utility per unit and to bill for use of such utilities.

Preferably, each of the units of the building is also wired to receive non-broadcast television signals. This wiring can be the telephone wires (in particular, fiber optic telephone wires) or distinct coaxial type wiring. Additionally, a plurality of closed circuit cameras 57 are located in common areas of the building. The closed circuit cameras have outputs adapted to be coupled to the wiring. The central monitoring station includes means (such as a simple electronic switch) for selectively connecting outputs of the various closed circuit cameras to individual apartments in accord with instructions, sent to the central monitoring unit by a tenant, for example, via the telephone lines. Thus, if there are closed circuit cameras located in a laundry room, on the rooftop and in the physical fitness center of a building, a father wishing to monitor the status of his son washing clothing in the laundry simply calls the central monitoring station, enters an appropriate command and a monitor in his apartment (e.g., his usual television set) is switched to the output from the closed circuit camera in the laundry room. Just as easily, the father can call the central monitoring station and switch to the output from the rooftop closed circuit camera to monitor the status of his sunbathing daughter.

Furthermore, signals from an outside cable company 56 can also be coupled to building wiring to provide cable TV reception for the tenants. The central monitoring station can also be used to monitor and control cable TV signals in a fashion identical to the closed circuit television control described above. Thus, selection of pay-per-view movies, concerts or sporting events and premium channels can all be effected by a user simply placing an intercom call to the central monitoring station.

The preferred embodiment of the present invention also include a file server 26 having a memory device and connected to the switch 1 by a telephone line. Each of the units has access to the file server over the building's telephone lines and switching means. Thus, resident software stored in the file server can be accessed by any unit by issuing appropriate commands over the telephone lines. Additionally, the file server 26 is coupled to the building's wiring and can be used to implement a form of inter-building pay-per-view and interactive software or subscriber services. Users wishing to view a certain movie or use interactive software or subscriber services will simply have to call the file server's unique telephone number and provide the necessary commands via a touch tone telephone to access such a movie.

Obviously, many modifications and variations of the present invention are possible in light of the above teachings. It is therefore to be understood that within the scope of the appended claims, the invention may be practiced otherwise than is specifically described.

I claim:

1. an integrated telephone, intercom, security and control system for a building having a plurality of building units comprising:

a plurality of telephone lines;

at least one telecommunications device located in at least one of said building units and connected to at least one of said telephone lines and having a unique telephone number;

switching means for receiving user programmed commands and being connected to said at least one telecommunications device by at least one of said telephone lines and arranged to connect at least one of said telephone lines either to at least another of said telephones line or to an outside telephone line;

a plurality of sensors located in each building unit and in common areas of the building for generating signals indicative of conditions therein;

at least one control module connected to said switching means by at least one of said telephone lines and having a unique telephone number and adapted to at least receive said signals generated by said sensors and determine said conditions from said signals;

a monitoring station, including a memory device and an output device, connected to said switching means by at least one of said telephone lines;

said at least one control module adapted to selectively send information indicative of said conditions to said monitoring station upon determining a change in at least one of said conditions in said each building unit or said common areas of the building via said telephone lines and said monitoring station adapted to receive and store said information in said memory and output data indicative of said conditions;

said at least one control module adapted to accept said user programmed commands from a user calling its unique telephone number via said switching means; and, said at least one control module adapted to be controlled by user programmed information stored in said memory of said monitoring station and downloaded to a memory in said at least one control module.

2. The system according to claim 1 wherein said monitoring station periodically polls each of said at least one control module to determine if said module is still active and outputs an indication of any inactive control module.

3. The system according to claim 1 wherein said plurality of telephone lines operate as both an intercom system and a telephone system for said building.

4. The system according to claim 1 wherein said building is an office building.

5. The system according to claim 1 wherein said switching means is located remotely from said building and is connected to said building by a private telephone line.

6. The system according to claim 1 wherein said switching means is located remotely from said building and is connected to said building by an outside telephone company line.

7. The system according to claim 1 wherein said plurality of telephone lines include analog lines and digital lines.

8. The system according to claim 1 wherein said telephone lines include copper lines and fiber optic lines.

9. The system according to claim 1 wherein said plurality of sensors include sensors for detecting at least one of a smoke condition, a hazardous air condition, a fire condition, an open/closed condition of at least an entry door to at least one of said units, an open/closed condition of a window of at least one of said units, movement of a person in at least one of said units, and movement of personal property from a predetermined position in at least one of said units.

10. The system according to claim 9 wherein the selective sending of information by said at least one control module is controlled by user programmed information stored in said memory of said monitoring station and downloaded to a memory of said monitoring station and downloaded to a memory in said at least one control module at the direction of supervisory personnel.

11. The system according to claim 9 wherein said monitoring station interprets information received from said at least one control module indicating a changed condition as an alarm condition.

12. The system according claim 11 wherein said monitoring station is further operable to display user programmed instructions stored in said memory of said monitoring station in response to said alarm condition.

13. The system according to claim 12 wherein said user includes at least one of the following: a tenant of one of said units, an office worker, a building supervisor, a building engineer and a unit owner.

14. The system according to claim 9 wherein said sensors are each connected to said at least one control module by a pair of electrically conductive wires.

15. The system according to claim 14 wherein a hall effect device connected to one of said plurality of sensors and connected to said at least one control module by a pair of electrically conductive wires produces a voltage indicative of a change in condition.

16. The system according to claim 9 wherein each sensor is connected to said at least one control module by wireless transmitters and receivers.

17. The system according to claim 14 wherein the information sent to said monitoring station by said at least one control module includes industry standard device codes.

18. The system according to claim 1 wherein said plurality of sensors includes a sensor located in at least one of said units and designated for activation by a person in physical distress in at least one of said units.

19. The system according to claim 1 wherein said telecommunications equipment includes at least one of the following: telephones, modems, digital computer modules, digital computer outlets, personal computers, and facsimile machines.

20. An integrated telephone, intercom, security and control system for a building having a plurality of building units comprising:

a plurality of telephone lines;

at least one telecommunications device located in at least one of said building units and connected to at least one of said telephone lines and having a unique telephone number;

switching means for receiving user programmed commands and being connected to said at least one telecommunications device by at least one of said telephone lines and arranged to connect at least one of said telephone lines either to at least another of said telephone lines or to an outside telephone line wherein each telephone line connected thereto has a unique telephone number;

a plurality of sensors located in each building unit and in common areas of the building for generating signals indicative of conditions therein;

at least one control module connected to said switching means by at least one of said telephone lines and having a unique telephone number and adapted to at least receive said signals generated by said sensors and determine said conditions from said signals;

a monitoring station, including a memory device and an output device, connected to said switching means by at least one of said telephone lines;

said at least one control module adapted to selectively send information indicative of said conditions to said monitoring station upon determining a change in at least one of said conditions in said each building unit or said common areas of the building via said telephone lines and said monitoring station adapted to receive and store said information in said memory and output data indicative of said conditions;

said at least one control-module adapted to accept said user programmed commands from a user calling its unique telephone number via said switching means and, said at least one control module adapted to be controlled by user programmed information stored in said memory of said monitoring station and downloaded to a memory in said at least one control module.

21. The system according to claim 20 wherein said at least one control module is adapted to selectively accept said user programmed commands from a user calling its unique telephone number via said switching means.

22. The system according to claim 21 wherein said at least one control module sends information to said monitoring station by calling its unique telephone number.

23. The system according to claim 22 wherein said at least one control module connected to said switching means by a single telephone line is adapted to drop a call from a user in the event information indicative of a changed condition is to be sent to said monitoring station.

24. The system according to claim 21 wherein user identification codes are stored in said monitoring station and downloaded to a memory in said at least one control module at the direction of supervisory personnel.

25. The system according to claim 24 wherein said at least one control module will only accept said commands after receiving recognizable user identification codes.

26. The system according to claim 25 wherein the selective sending of information by said at least one control module is controlled by user programmed information stored in said memory of said monitoring station and downloaded to the memory in said at least one control module at the direction of supervisory personnel.

27. The system according to claim 26 wherein said downloaded user programmed information includes the amount of time from determination of a change in said at least one condition by which a user must input a recognizable identification code to prevent said at least one control module from sending to said monitoring station information indicating the changed condition.

28. The system according to claim 25 wherein said at least one control module is adapted to recognize commands entered via a touch tone telephone.

29. The system according to claim 25 wherein said at least one control module is adapted to recognize voice commands.

30. The system according to claim 25 wherein one of said user identification codes signifies an emergency condition and the control module transmits a signal of such condition silently to said monitoring station.

31. The system according to claim 21 wherein said commands include selectively activating/deactivating at least one of said plurality of sensors and said at least one control module disregards said signal received from a deactivated sensor.

32. The system according to claim 31 wherein, in response to a command requesting status information, said at least one control module is adapted to provide the user with information concerning the activation/deactivation status of selected ones of said plurality sensors.

33. The system according to claim 31 wherein, in response to a command requesting status information, said at least one control module is adapted to provide the user with information concerning any changed conditions.

34. The system according to claim 32 wherein said at least one control module includes a voice synthesizer for producing said status information.

35. The system according to claim 21 wherein said at least one control module is further adapted to transmit signals to at least one device located in at least one of said units to activate/deactivate said at least one device.

36. The system according to claim 35 wherein said at least one control module is further adapted to determine the activation/deactivation status of said at least one device.

37. The system according to claim 36 wherein said at least one control module is further adapted to send information indicative of a change in activation/deactivation status of said at least one device to said monitoring station.

38. The system according to claim 35 wherein said at least one device includes at least one of the following: an air conditioning unit, a video cassette recorder, a radio, a television set, an oven, a heater, a pet feeder, a door, a door latch, a file cabinet, a personal computer and a photocopy machine.

39. The system according to claim 35 wherein said commands include commands for activating/deactivating said at least one device.

40. The system according to claim 39 wherein, in response to a command requesting status information, said at least one control module is adapted to provide the user with information concerning the activation/deactivation status of said at least one device.

41. The system according to claim 35 wherein said at least one device is connected to said at least one control module via a low voltage relay.

42. An integrated telephone, intercom, security and control system for a building having a plurality of building units comprising:

a plurality of telephone lines;

at least one telecommunications device located in at least one of said building units and connected to at least one of said telephone lines and having a unique telephone number;

switching means for receiving user programmed commands and being connected to said at least one telecommunications device by at least one of said telephone lines and arranged to connect at least one of said telephone lines either to at least another of said telephone lines or to an outside telephone line;

a plurality of sensors located in each building unit and in common areas of the building for generating signals indicative of conditions therein;

at least one control module connected to said switching means by at least one of said telephone lines and having a unique telephone number and adapted to at least receive said signals generated by said sensors and determine said conditions from said signals;

at least one monitoring station, including a memory device and an output device, connected to said switching means by at least one of said telephone lines;

said at least one control module adapted to selectively send information indicative of said conditions to at least one of said monitoring station upon determining a change in at least one of said conditions in said each building unit or said common areas of the building via said telephone lines and said at least one monitoring station adapted to receive and store said information in said memory and output data indicative of said conditions;

said at least one control module adapted to accept said user programmed commands from a user calling its unique telephone number via said switching means; said least one control module adapted to be controlled by user programmed information stored in said memory of said at least one monitoring station and downloaded to a memory in said at least one control module;

said at least one monitoring station adapted to receive information from all of said control modules in said building;

said at least one monitoring station adapted to process information from said control modules which are arranged to receive said signals from said sensors under normal conditions of operation in different sections of said building;

each of said at least one monitoring station adapted to process information from any said control module in any section of said building in the event of emergency conditions in said building; and, each of said at least one monitoring station adapted to poll each of the other said monitoring stations to confirm that each of the other said monitoring stations is functioning properly.

43. The system according in claim 42 wherein said plurality of sensors for determining conditions is said common areas include sensors for determining the open/closed status of a plurality of doors located in common area of said building.

44. The system according to claim 43 wherein said control module is programmed to delay outputting to said control unit door signals generated by said door sensors for a preset time.

45. The system according to claim 44 wherein said preset time is approximately ten seconds.

46. The system according to claim 42 wherein said at least one monitoring station includes at least a central alarm station and a concierge station having a personal computer and a printer, said central alarm station adapted to receive said information from said at least one control module and transmit a data stream representative of said information to the personal computer.

47. The system according to claim 46 wherein said personal computer is adapted to receive and store data transmitted thereto and output to said monitor and printer alarm conditions and said user programmed information.

48. The system according to claim 46 wherein said at least one monitoring station is located in an office of appropriate building supervisory personnel.

49. The system according to claim 48 further comprising at least one mechanical alarm panel connected to said switching means via at least one of said plurality of telephone lines and adapted to receive information from a plurality of devices throughout said building and forward such information in digital form, via said switching means, to appropriate building supervisory personnel.

50. The system according to claim 49 wherein said devices include at least one of the following: a thermometer, a barometer, a relay, a fan, a motor, a flow meter, a chiller, a boiler and a waterheater.

51. The system according to claim 49 wherein each unit includes at least one meter for measuring consumption of a plurality of utilities and arranged to output data to said supervisory personnel indicative of said consumption via said at least one mechanical alarm panel.

* * * * *